Figure 1:
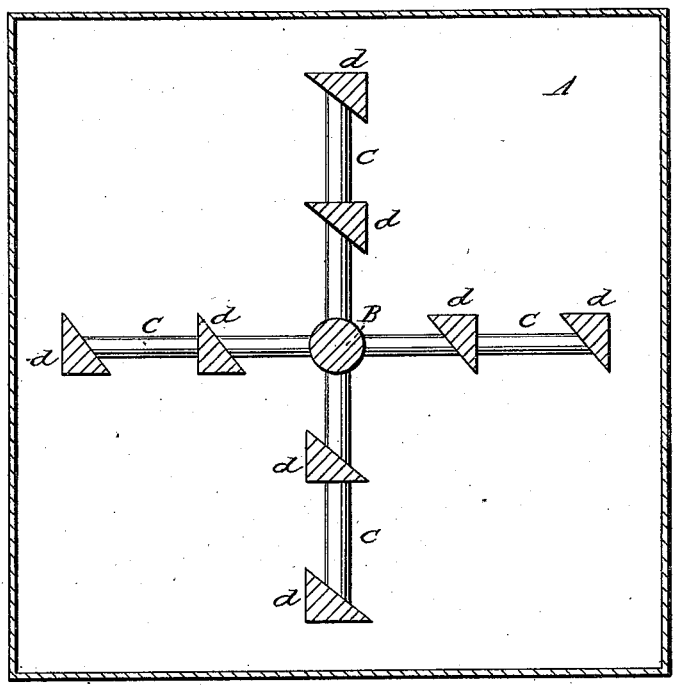

W. B. TUCKER.
Churn.

No. 62,786

Patented March 12, 1867.

Witnesses:
O. F. Baker.
W. Burris

Inventor:
Wm B. Tucker
By his Attorney
Z. C. Robbins

United States Patent Office.

WILLIAM B. TUCKER, OF HILLSBOROUGH, OHIO.

Letters Patent No. 62,786, dated March 12, 1867.

IMPROVEMENT IN CHURNS.

*The Schedule referred to in these Letters Patent and making part of the same.*

TO ALL WHOM IT MAY CONCERN:

Be it known that I, WILLIAM B. TUCKER, of Hillsborough, in the county of Highland, and State of Ohio, have invented a new and useful Improvement in Churns; and I do hereby declare that the following is a full and exact description thereof, reference being had to the accompanying drawing, which forms a portion of this specification.

My improvement relates to rotary churn-dashers, and is applicable to said dashers whether they may be arranged to operate in a vertical or a horizontal position.

In the accompanying drawing, A is the churn box; B is the dasher-shaft, which is pivoted within said box; C C are dasher-arms; and $d\ d$ are the dasher-blades.

My improvement consists in securing angular three-sided dasher-blades in reversed positions upon alternate dasher-arms, as shown in the drawing, the arrangement being such that, whilst the sharp edges of the blades on one set of dasher-arms will strike into the cream and draw it towards the centre of the churn, the succeeding set of dasher-blades will present flat surfaces to the cream, and force it outwards from the centre of the churn, and so on in regular succession; and the aforesaid alternating action of the dasher-blades upon the cream will be produced by rotating the churn-dasher in either direction. This said alternating outward and inward action of the successive series of churn dasher-blades, producing a combined frictional, percussive, and agitating effect upon the cream, is found in practice to accomplish the production of butter in the shortest possible time, and is believed to be superior to any other shape and arrangement of churn dasher-blades now in use.

Having thus fully described my improvement in churns, what I claim therein as my invention, and desire to secure by Letters Patent, is—

Combining the angular dasher-blades in alternating positions upon the dasher-arms of said churn, substantially in the manner and for the purpose herein set forth.

The aforegoing specification of my new and useful improvement in churns signed and witnessed this 3d day of January, 1867.

WILLIAM B. TUCKER.

Witnesses:
JAS. H. MULLERIX,
ISAAC W. TUCKER.